May 23, 1961 H. A. HAYDEN 2,985,041
METHOD AND MACHINE FOR PRODUCING TWIST DRILLS
Filed May 11, 1953 4 Sheets-Sheet 1

INVENTOR.
Howard A. Hayden.
BY
Harness, Dickey & Pierce
ATTORNEYS.

May 23, 1961   H. A. HAYDEN   2,985,041
METHOD AND MACHINE FOR PRODUCING TWIST DRILLS
Filed May 11, 1953   4 Sheets-Sheet 2

INVENTOR.
Howard A. Hayden.
BY
Harness, Dickey & Pierce
ATTORNEYS.

May 23, 1961 H. A. HAYDEN 2,985,041
METHOD AND MACHINE FOR PRODUCING TWIST DRILLS
Filed May 11, 1953 4 Sheets-Sheet 3
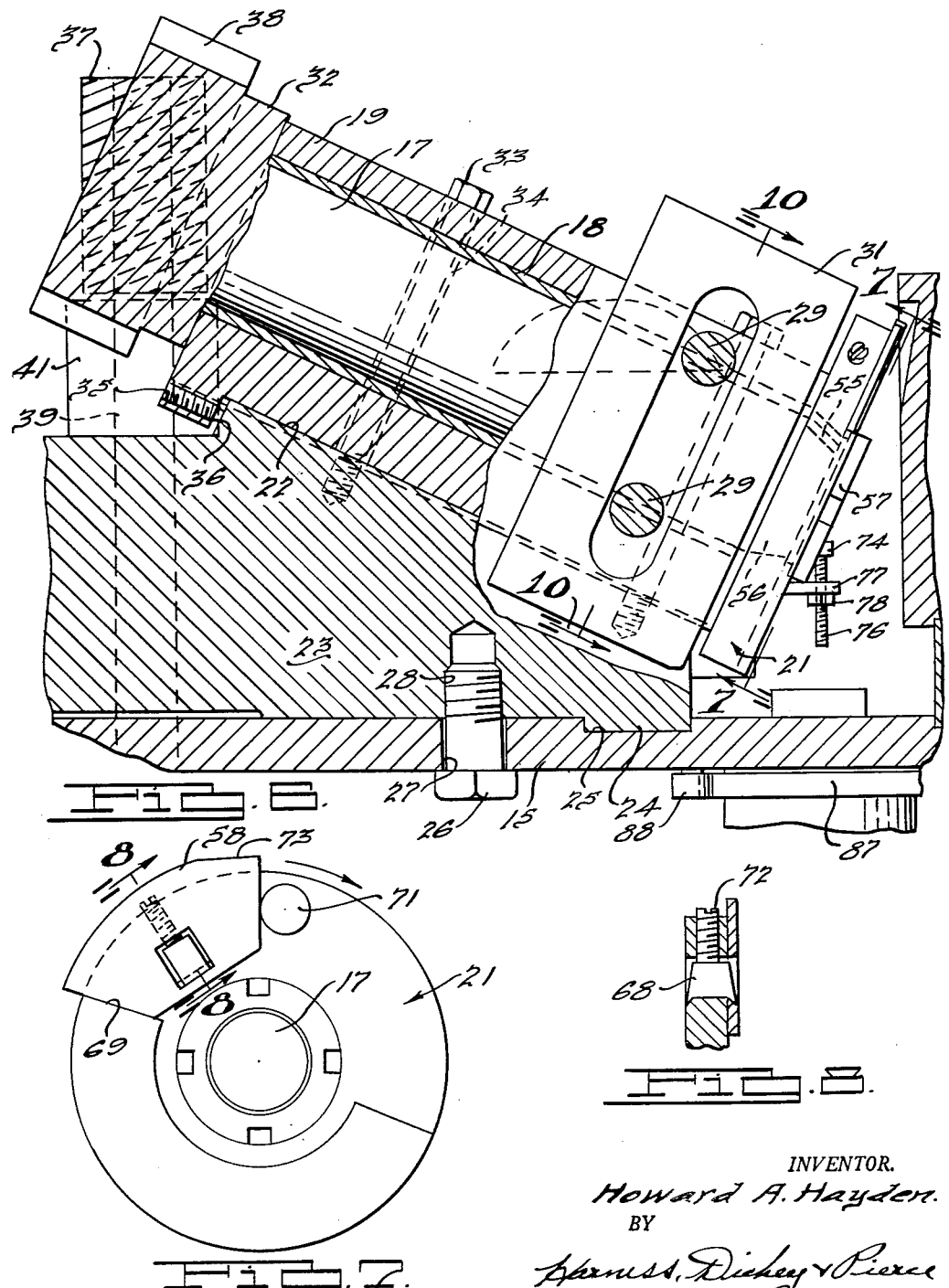
INVENTOR.
Howard A. Hayden.
BY
Barnes, Kisern & Pierce
ATTORNEYS.

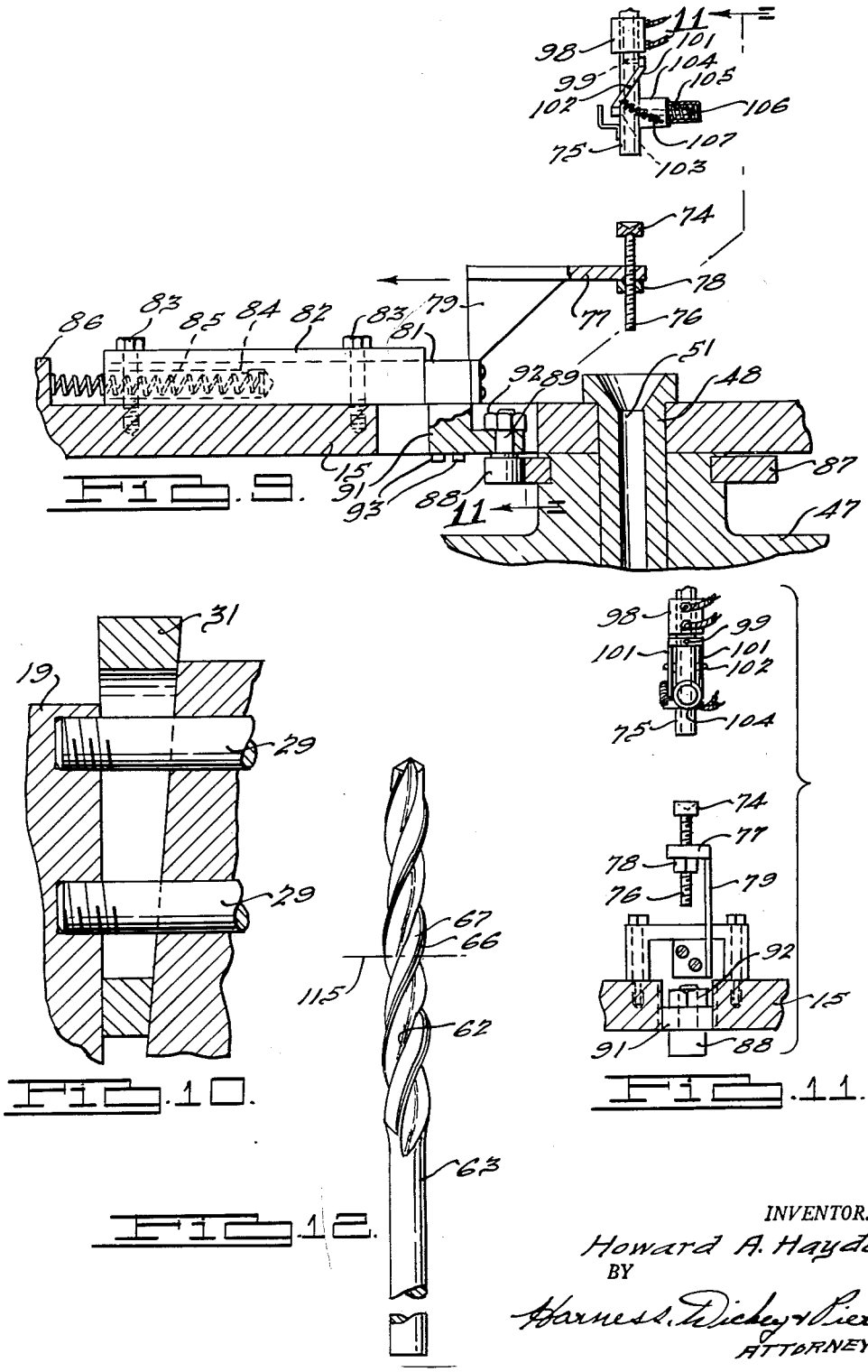

United States Patent Office

2,985,041
Patented May 23, 1961

2,985,041

METHOD AND MACHINE FOR PRODUCING TWIST DRILLS

Howard A. Hayden, Detroit, Mich., assignor to Hayden Twist Drill Company, Detroit, Mich., a corporation of Michigan Filed May 11, 1953, Ser. No. 354,160

2 Claims. (Cl. 80—6)

This invention relates to methods and machines for manufacturing twist drills, and particularly to a method and machine for manufacturing twist drills from heated lengths of rod material.

Heretofore, when constructing twist type drills, a length of rod was employed in which helical flutes were machined, after which relief was applied rearwardly of the helical edges. A large amount of material was machined from the rod and the operation was costly in material, labor and tool expense.

In practicing the present invention, a much shorter length of rod is employed for producing the desired length of twist drill. The helical lands are formed in a heated blank by the machine and method of the present invention. Rolls are employed which are sunk into opposite sides of the rod and the metal of the rod is extruded ahead of the rolls as the lands are rolled therein, which substantially lengthens the rod and the lands and grooves extending from the shank end. The depth of the groove varies from the shank end, where the metal between the groove is thicker, to the tip end where the grooves are deeper and the metal therebetween substantially thinner. The forging operation is produced by four rolls, two of which form the grooves, the other of which form the lands and a bead or margin on each land at the advancing edge. Thereafter, the forged rod is ground in a centerless grinding machine to produce a desired diameter across the margins and a sharp edge between the margins and the grooves. The land portion rearwardly of the margin is of reduced diameter, providing relief or clearance to the edge, as is conventional practice.

The machine has four driven heads adjusted in predetermined angular relation to each other conforming to the slope of the helical lead of the drill. Plates are provided on the heads, two oppositely disposed plates containing a convex face for forming the grooves, the other two oppositely disposed plates having a concave edge contour which forms the lands and the adjacent margins. The heads are adjustable toward and away from each other for the purpose of operating on rods of different diameters. The heads are mounted for rotation or oscillation which moves the plates into engagement with the rod and for thereafter swaging or rolling the lands and grooves therein. The rod is first heated and dropped between the heads onto a receiving cup and the heads are rapidly operated to sink the plate edge faces into the rod and cause the rod to move upwardly as the groove and land are continuously formed. During the forming operation, the metal of the rod ahead of the plates is extruded to extend the portion of the rod worked upon to approximately twice its length. After the plates pass from the end of the rod, the rod is free to fall downwardly between the heads, past the supporting cup which has been retracted, into a quenching bath provided below the heads. The cup is returned and the machine is again in a position ready to receive another heated blank.

Accordingly, the main objects of the invention are: to provide a method of producing twist drills without the waste of any substantial amount of material; to form a twist drill by heating a rod and swaging the lands and grooves therein while extending the metal of the rod being worked upon to substantially twice its length; to operate a plurality of plates on the heads of a machine located on the angle of the helix to be applied to a drill into engagement with a heated rod for grooving and shaping lands and margins on the rod as the rod is advanced by the operation of the plates thereon, and, in general, to form lands and grooves in a drill by a machine and method which groove a rod and form lands with a margin thereon without the waste of metal and with a minimum of time.

Other objects and features of novelty of the invention will be specifically pointed out or will become apparent when referring, for a better understanding of the invention, to the following description, taken in conjunction with the accompanying drawings, wherein:

Fig. 6 is an enlarged, sectional view of the structure illustrated in Fig. 4, taken on the line 6—6 thereof;

Fig. 7 is an enlarged view of the structure illustrated in Fig. 6, as viewed from line 7—7 thereof;

Fig. 8 is an enlarged, broken sectional view of the structure illustrated in Fig. 7, taken on the line 8—8 thereof;

Fig. 9 is an enlarged sectional view of the structure illustrated in Fig. 4, taken on the line 9—9 thereof;

Fig. 10 is a sectional view of the structure illustrated in Fig. 6, taken on the line 10—10 thereof;

Fig. 11 is a sectional view of the structure illustrated in Fig. 9, taken on the line 11—11 thereof, and Fig. 12 is a view of a helical drill made by the method and machine of the present invention.

Figure 1:
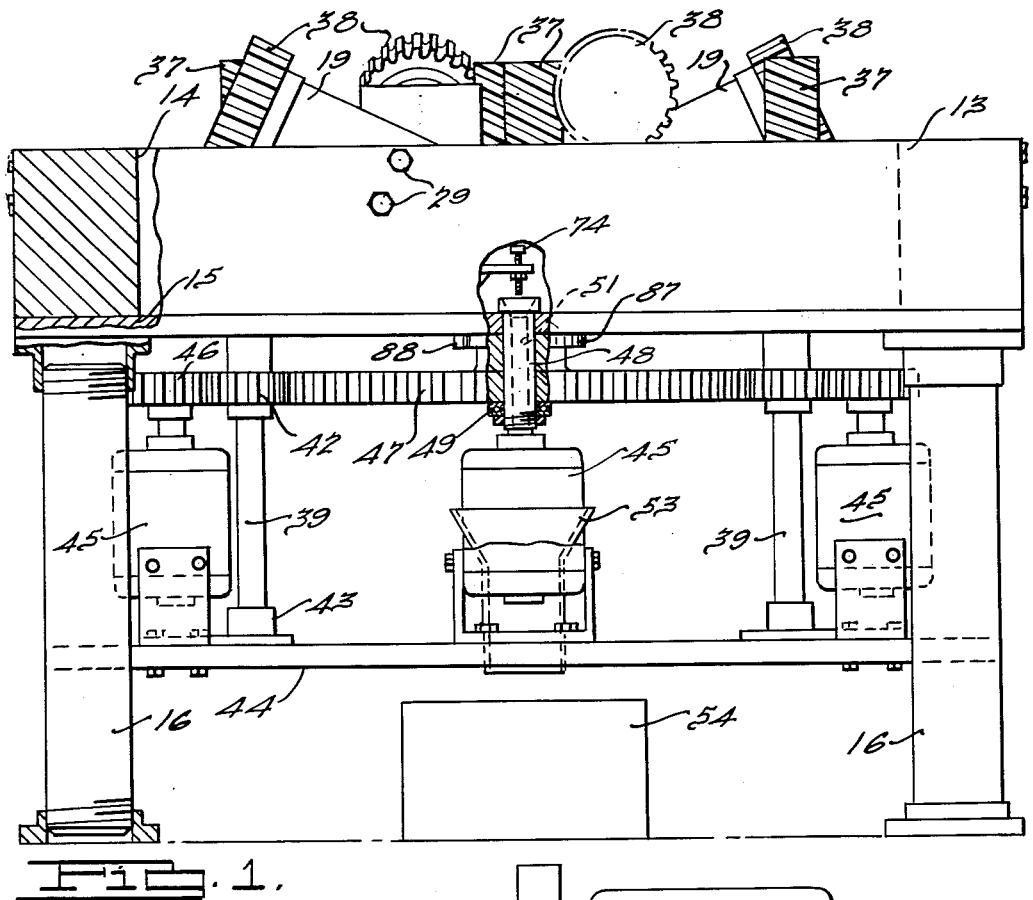
Figure 1 is a view in elevation of a machine embodying features of the present invention, for rolling lands and grooves in a rod for producing a helical drill.

A frame 13 is formed from a heavy piece of metal to have a central opening 14 therein and a peripheral wall of substantial strength. The frame may be mounted in any suitable manner, as on a base plate 15 mounted on pipe legs 16. Four spindles 17 are mounted in bearings 18 within carrier blocks 19. To provide a proper tilt to the rotatable heads 21 on the end of the spindles 17, the blocks 19 are mounted on the sloping surface 22 of the supporting blocks 23. The supporting blocks have downwardly extending keys 24 which project within slots 25 in the plate 15. Bolts 26 extend through slots 27 in the plate 15 into threaded apertures 28 in the block. In this arrangement, the blocks 23 may be shifted laterally for adjusting the position of the spindles on the plate 15. A pair of bolts 29 extends through the sides of the frame 13 through a wedge 31 into the carrier blocks 19 for the purpose of clamping the blocks to each other and the base 13 after the block 19 has been adjusted to a desired position by the shifting of the wedge. The outer end of each of the spindles 17 has a gear 32 mounted thereon when a gear drive is employed for actuating the spindles. The carrier block 19 is retained upon the supporting block 23 by a plurality of bolts 33 extending through enlarged openings 34 which permit a predetermined axial adjustment of the blocks 19 forward and backward on the blocks 23. The forward positions of the carrier blocks 19 are controlled by set screws 35 which abut the shoulder 36 on the supporting blocks 23.

Worms 37 are disposed in engagement with the teeth 38 of the gears 32, the teeth being parallel to the spindle 17 and being of the spur type. The worms 37 are mounted on shafts 39 on bearings 41 on the supporting blocks 23. The shafts extend through the plate 15, and gears 42 are mounted in fixed relation thereto. The lower ends of the shafts 39 rest upon a thrust bearing (not shown) in supporting cups 43 secured to a plate 44 attached to the legs 16. The four gears 42 thus provided are driven by four motors 45 from gears 46 mounted on the motor shafts. A central or bull gear 47 interconnects all of the four gears 42 so that they will be driven in synchronism with each other by the four motors. The bull gear is mounted on a hollow shaft 48 carried by the plate 15 on a thrust bearing 49 secured on the end of the shaft. The central opening 51 through the shaft 48 permits the workpieces to pass therethrough into a funnel 53 from which they drop into a quenching tank 54 provided therebelow. In this arrangement, all four of the motors are energized simultaneously for producing the driving of the four worms 37 and spindles 17, which driving occurs simultaneously in view of the presence of the bull gear 47.

Figure 5:
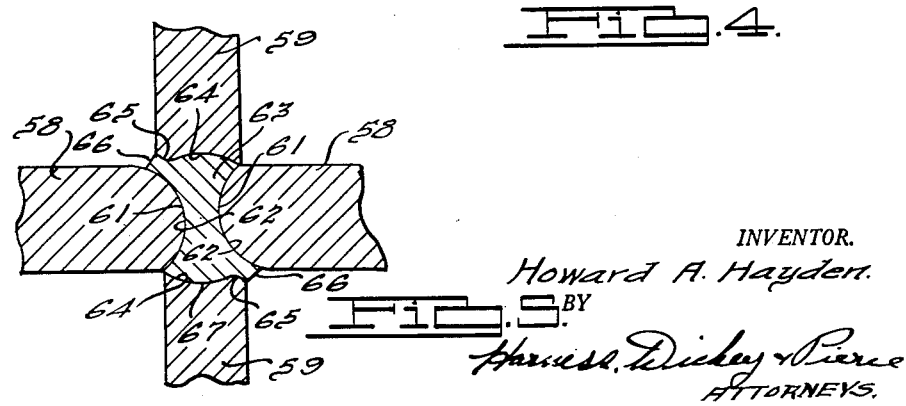
Fig. 5 is a sectional view through the work-performing plates of the machine, taken at the point of engagement of the plates with the rod being worked upon.

The heads 21 on the spindles 17 are securely fixed thereto by a key 55 on a tapered end 56 by a spanner nut 57. Two of the four heads are provided with grooving plates 58, while the remaining two heads, which are spaced therebetween, have land and bead or margin forming plates 59 thereon. These plates, as illustrated in Fig. 5, are disposed in pairs in opposite and alternate relation to each other. The plates 58 have convex edge portions 61 in the nature of a formed roll, which portions form the grooves 62 in the blank 63. The plates 59 have concave face portions 64 terminating at one edge with a convex section 65 which is spaced from the plates 58. The convex section 65 causes beads 66 to be formed between the leading edges of the lands 67 and the grooves 62, the beads or margins being dressed in a centerless grinding machine after the forming operation to produce a desired diameter thereacross.

The plates 58 and 59 are secured in any suitable manner to the heads 21. In Figs. 7 and 8 the plates are illustrated as being releasably secured to the heads by clamping blocks 68 which anchor one edge of the plates against a shoulder 69 and the other edge against a pin 71 spaced from the shoulder 69. The shoulder 69 is slightly tilted from a radial position so as to form an increased web in the drill. With this arrangement, the plates may be readily removed for repair or replacement when different size plates are to be used for different size drills to be manufactured.

Figure 4:
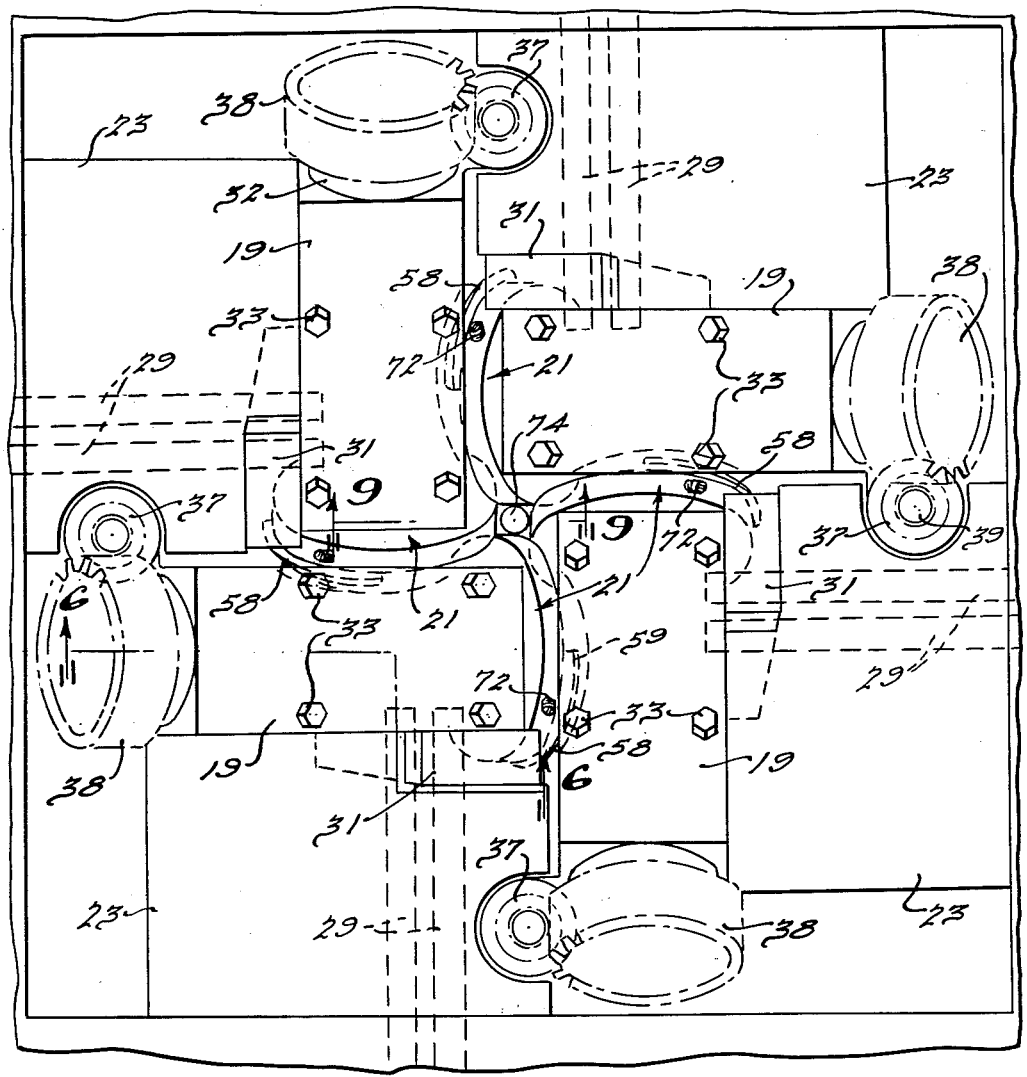
Fig. 4 is an enlarged, broken plan view of a portion of the machine illustrated in Fig. 1.

It will be noted from Fig. 7 that a flat portion 73 is provided on each one of the four plates, which flat portions are disposed at right angles to each other to form a square opening, as illustrated in Fig. 4, through which the blank drops when fed into the machine. The blank drops upon a cup 74 from a tube 75 which is disposed thereabove in alignment therewith. The four flat sides 73 retain the blank centered between the plates 58 and 59 in position to be operated on thereby. The cup is mounted on a threaded stem 76 and supported in a threaded aperture in an arm 77 to be locked in adjusted position by a nut 78. As illustrated in Figs. 9 and 11, the arm 77 is carried by a plate 79 on a slide 81 which is mounted on the plate 15. The slide is retained within the inverted channel element 82 which is fixed on the plate 15 by bolts 83. The slide 81 has an aperture 84 therein containing a spring 85, the outer end of which abuts a stop block 86 on the top of the plate 15. The bull gear 47 carries a cam plate 87 which is engaged by a roller 88 carried on a stud shaft 89 secured to a block 91 by a nut 92, the block being secured to the slide 81 by bolts 93. As the bull gear 47 rotates, the cam portion of the cam ring 87 moves the roller 88 and the slide 81 away from the shaft 48, to thereby move the cup 74 out of the position of alignment with the tube 75. This movement occurs near the end of the operation on the workpiece 63 so that when the workpiece is thrown upwardly by the plates 58 and 59 at the end of the operation, it is free to drop downwardly through the central opening 51 in the shaft 48 through the funnel 53 into the quenching bath 54.

While various control systems may be provided for starting and stopping the machine to have it stop exactly in the same position, with the flat portions 73 of the plates disposed in adjacent parallel relation, the present arrangement utilizes a braking force on the motors for stopping the machine and a separate motor for advancing the machine to its initial starting position. In the present machine, the four motors 45 are energized simultaneously to drive the heads 21 to perform the rolling and extruding operations. Immediately thereafter, the current is reversed to interrupt the operation of the motors 45 and apply a braking force to the motors and therefore to the heads, the current being disconnected by a plugging switch before the motors 45 drive the heads in a reverse direction. A short time interval occurs before a motor 94 is energized, the motor having a brake thereon which is immediately set to stop the rotation of the shaft when the motor is deenergized. The motor 94 is energized for driving through a reduction head 95 and gear 96 to drive the four gears 42 through the bull gear 47 to advance the heads to the exact initial starting position. When this point is reached, the motor 94 is de-energized and the brake thereof is applied to the motor shaft to produce the accurate stopping of the rotation of the heads. The motor 94 is of the standard brake type and is mounted on the plate 44 in any suitable manner, as by a standard 97. The motors 45 drive the heads 21 at a speed of approximately 400 feet per minute, so that only a small fraction of a second is required to produce the helical grooves 62, the lands 67 and the margins 66 on the rod as it is extruded thereby. The time delay in operating the motor 94 is extremely short, only that required for the dropping of the finished drill after it is tossed upwardly by the plates at the end of each operation.

When a blank is to be operated upon, it is first heated to the proper temperature and dropped between the plates 58 and 59 to rest upon the cup 74, after which a circuit is completed to energize the motors 45 which drive the heads 21 in rotation. After the drill has been formed, the current is immediately reversed to interrupt the rotation of heads 21, and the complete cycle of rotation of the heads is completed thereafter by the motor 94. Before the motor 94 is operated, the cup 74 is retracted and the finished workpiece drops through the heads 21 and the funnel 53 into the quenching tank 54.

In Figs. 9 and 11, the tube 75 is illustrated as being provided with an induction heating coil 98 in which the blanks are heated to slightly above a desired temperature, the blanks being retained in the tube by a finger 99 on a frame 101 secured by a pivot 102 to the tube. The opposite end of the frame contains a finger 103 which also extends through the wall of the tube 75. A solenoid 104 has its armature 105 urged forwardly by a spring 106 to be in a position to rock the frame 101 clockwise to move the finger 99 from engagement with the lowermost rod which may drop downwardly and rest upon the end of the armature. When the solenoid is energized, the armature is retracted, permitting the delivered rod to pass from the tube onto the cup 74. A spring 107 rotates the frame 101 in a counterclockwise direction, moving the finger 99 in position to engage the next adjacent rod in the tube 75 and retain it in position to be heated by the induction coil 98. Just prior to the time that a rod is to be delivered to the cup 74, the solenoid is de-energized to permit the spring to again move the armature forwardly to rock the frame 101 to permit the heated rod to drop down into engagement therewith. The energization thereafter of the solenoid drops the heated rod onto the cup and the spring 107 moves the finger 99 to intercept the lowermost rod and retain it in position to be heated. The solenoid may be connected into the wiring system of the machine so that the operation of delivering heated rods to the machine and the operation of the machine thereon and the delivery therefrom into the quenching tank will be entirely automatic.

It is to be understood that the heads 21 may be laterally and arcuately adjusted toward and away from each other and about the shafts 39 as a center and the carrier blocks 19 may be shifted longitudinally upon the supporting blocks 23. In this manner, the heads are accurately adjusted relative to each other so as to have the plates operate on rods of various diameters. It is to be understood that sets of plates 58 and 59 are provided for each size diameter of rod to be operated on and that a series of helical drills of varying diameters may be rolled by the machine.

A simple operating cycle for the device will be initiated upon the dropping of the workpiece from the heater onto the cup 74 when the solenoid 104 is energized. Upon this occurrence, contacts are closed which completes a circuit to the four motors 45 which drive the rolls 21 and simultaneously advance the plates 58 and 59 to have the adjacent edges move upwardly to roll the spiral lands and grooves on the upper end of the workpiece. As soon as the rear edges of the plates 58 and 59 pass beyond the swaged portion of the workpiece, it is released and after being thrown slightly upwardly, due to the inertia thereof, the completed workpiece will fall backward through the space between the rolls into the funnel 36 from which it will be directed from the machine. When the bull gear 47 is moved substantially 360°, a switch is operated which reverses the flow of current to the motors 45 and thereby applies a braking action thereto. However, before the motors can be reversed in rotation, a plugging switch cuts off the current and energizes a time delay relay. After the slight delay produced by the relay, the contacts thereof close and the motor 94 is energized to drive the bull gear until a second switch is operated, which immediately de-energizes the motor 94 which sets the brake thereof to accurately stop the motor shaft and bull gear, as well as the gear 37 and 38 of the rolls, thus accurately resetting the rolls and plates at exactly the same spot at the end of each swaging operation. When the circuit to the motor 94 is de-energized, the solenoid 104 may be energized to have the cycle automatically repeat itself.

Figures 2, 3:
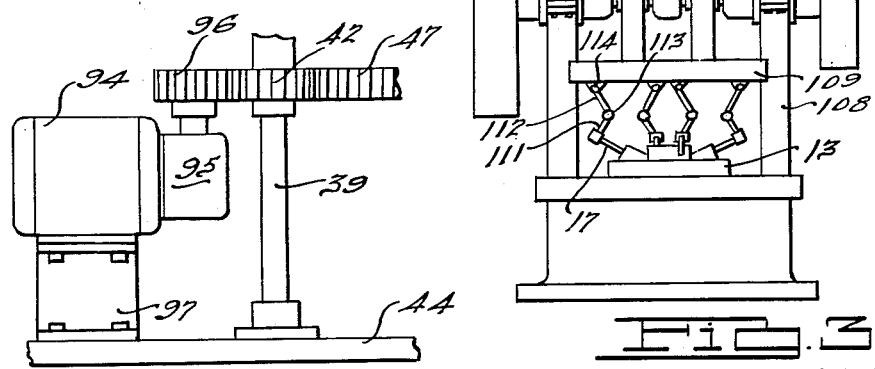
Fig. 2 is a drive for the machine illustrated in Fig. 1, which is not shown thereon.
Fig. 3 illustrates a punch press employed as the drive means for operating the rolls of the machine illustrated in Fig. 1.

Referring to Fig. 3, a further form of operating means is illustrated for actuating the heads 21. In this arrangement, the frame 13 is mounted on the bed of a press 108 of conventional form which has two half cycles of operation, that is to say, a first for moving the ram 109 downwardly and the second for retracting the ram 109 to its initial position. Only a short dwell time is necessary between the half cycles, that to permit the workpiece 63 to drop downwardly through the bed after being thrown upwardly by the action of the plates 58 and 59 thereon. The spindles 17 are extended and have an arm 111 connected thereto. Pitmans 112 are connected by ball joints 113 and 114 to the arms 111 and to the ram 109. The downward movement of the ram 109 produces the rotation of the spindle 17 through an angle of substantially 90°, thereby to move the plates 58 and 59 a sufficient distance to complete the operation on a workpiece 63 and to provide a gap through which the workpiece may drop. The upward movement of the ram 109 which occurs immediately thereafter returns the heads 21 and the plates to their initial starting position.

From the examples given, it is to be understood that the heads 21 may be completely rotated from the initial position back to the initial position or may be oscillated from initial position through an angle sufficient to perform the swaging operation upon the drill 63 and thereafter be returned to their initial position. Whether or not a movement in rotation or oscillation is applied to the heads and plates, the same result is obtained in producing the helical grooves, lands and margins on the drill blank. Not only is there a substantial saving in time and labor by forming the rod into a drill by the present method, but a substantial saving of material is also obtained thereby. This saving in metal will be apparent when examining the length of rod used as a blank illustrated by the dot and dash line 115 in Fig. 12, the portion of the drill therebeyond being extruded during the rolling operation thereon.

What is claimed is:

1. In a machine for producing twist drills, a base, spindles on said base, heads on the ends of said spindles which are disposed adjacent to each other and positioned at an angle conforming to the lead of the helical grooves to be applied to the drill, plates releasably supported on said head the opposite plates being alike, one set of opposite plates having convex faces, the other set of plates having concave faces, the former of the plates forming the grooves while the latter form the lands between the grooves, means for supporting a blank between the plates, and means rotating the heads to move the edges of the plates upwardly for rolling grooves in the blank and confining the swaged metal to form the lands as the swaged metal is extruded downwardly to lengthen the blank.

2. In a machine for producing twist drills, a base, spindles on said base, heads on the ends of said spindles which are disposed adjacent to each other and positioned at an angle conforming to the lead of the helical grooves to be applied to the drill, plates releasably supported on said head the opposite plates being alike, one set of opposite plates having convex faces, the other set of plates having concave faces, the former of the plates forming the grooves while the latter form the lands between the grooves, means for supporting a blank between the plates, and means rotating the heads to move the edges of the plates upwardly for rolling grooves in the blank and confining the swaged metal to form the lands as the swaged metal is extruded downwardly to lengthen the blank, the plates being sectors leaving an opening therebetween after the swaging operation to permit the formed blank to drop downwardly therebetween.

References Cited in the file of this patent

UNITED STATES PATENTS

| | | |
|---|---|---|
| 62,684 | Putnam et al. | Mar. 5, 1867 |
| 317,287 | Boardman | May 5, 1885 |
| 408,673 | Rogers | Aug. 6, 1889 |
| 432,635 | Moore | July 22, 1890 |
| 508,161 | Barclay | Nov. 7, 1893 |
| 714,890 | Gieshoidt | Dec. 2, 1902 |
| 968,400 | Peck | Aug. 23, 1910 |
| 1,778,032 | Kirsch | Oct. 14, 1930 |
| 2,168,340 | Hill | Aug. 8, 1939 |
| 2,207,245 | Dvorak | July 9, 1940 |
| 2,317,244 | Bailey | Apr. 20, 1943 |
| 2,338,975 | Schumacher | Jan. 11, 1944 |
| 2,341,916 | Hansen | Feb. 15, 1944 |
| 2,394,183 | Jaecker | Feb. 5, 1946 |
| 2,430,368 | Rearden | Nov. 4, 1947 |
| 2,457,132 | Delaney | Dec. 28, 1948 |
| 2,464,658 | Stiven | Mar. 15, 1949 |
| 2,495,387 | Rummins | Jan. 24, 1950 |
| 2,533,227 | Delaney | Dec. 12, 1950 |

FOREIGN PATENTS

| | | |
|---|---|---|
| 420,485 | Great Britain | Dec. 3, 1934 |
| 435,402 | France | Dec. 3, 1911 |
| 438,033 | Germany | Dec. 3, 1926 |
| 453,560 | Germany | Dec. 9, 1927 |